US009654215B2

United States Patent
Vojtěch et al.

(10) Patent No.: US 9,654,215 B2
(45) Date of Patent: May 16, 2017

(54) MODULAR KIT OF THE SPECTRALLY FLEXIBLE DEVICE FOR BIDIRECTIONAL TRANSMISSIONS OF OPTICAL SIGNALS SENSITIVE TO TIMING IN THE INTERNET AND OTHER NETWORKS

(71) Applicant: CESNET, zajmove sdruzeni pravnickych osob, Prague (CZ)

(72) Inventors: Josef Vojtěch, Prague (CZ); Jan Radil, Prague (CZ); Radan Slavík, Southampton (GB); Stanislav Šíma, Sázava (CZ); Ondřej Havliš, Brno (CZ)

(73) Assignee: CESNET, ZAJMOVE SDRUZENI PRAVNICKYCH OSOB, Prague (CZ)

( * ) Notice: Subject to any disclaimer, the term of this patent is extended or adjusted under 35 U.S.C. 154(b) by 0 days.

(21) Appl. No.: 15/146,507

(22) Filed: May 4, 2016

(65) Prior Publication Data
US 2016/0329964 A1 Nov. 10, 2016

(30) Foreign Application Priority Data
May 4, 2015 (CZ) ..................... 2015-304

(51) Int. Cl.
*H04B 10/00* (2013.01)
*H04B 10/25* (2013.01)
(Continued)

(52) U.S. Cl.
CPC ... *H04B 10/2503* (2013.01); *H04B 10/07955* (2013.01); *H04B 10/07957* (2013.01)

(58) Field of Classification Search
CPC .. H04B 10/2503; H04B 10/29; H04B 10/291; H04B 10/2912; H04B 10/2914; H04B 10/2918
See application file for complete search history.

(56) References Cited

U.S. PATENT DOCUMENTS 6,067,187 A 5/2000 Onaka et al.
7,362,498 B1 * 4/2008 Li ..................... H04B 10/2931
359/341.41
(Continued)

FOREIGN PATENT DOCUMENTS

EP 0 777 346 A2 6/1997
EP 1 304 782 A2 4/2003

OTHER PUBLICATIONS

Search Report (PCT/ISA/210) issued on Oct. 12, 2015, by the Industrial Property Office of the Czech Republic in corresponding Patent Application No. 2015-304.

*Primary Examiner* — Daniel Dobson
(74) *Attorney, Agent, or Firm* — Buchanan Ingersoll & Rooney PC

(57) ABSTRACT

Modular kit of the spectrally flexible device for bidirectional transmissions of optical signals sensitive to timing in the Internet and other networks in the basic embodiment contains the source of the optical holding signal, which is electrically bi-directionally interconnected with the control electronics module. This source of the optical holding signal is optically interconnected is optically interconnected by its one output via the first isolator and the first wave-sensitive coupler with one optical input/output of the semiconductor optical amplifier and/or the second output of the source of the optical holding signal is interconnected via the second isolator and the second wave-sensitive coupler with the second optical input/output of the semiconductor optical amplifier. Semiconductor optical amplifier is electrically bi-directionally interconnected with the control electronics module, the input of which is connected to the output of the power supply module.

20 Claims, 1 Drawing Sheet

(51) Int. Cl.
*H04B 10/079* (2013.01)
*H04J 14/00* (2006.01)

(56) References Cited

U.S. PATENT DOCUMENTS

| | | |
|---|---|---|
| 2003/0072076 A1 | 4/2003 | Yoon et al. |
| 2009/0067037 A1* | 3/2009 | Hayashi ............. H01S 3/06754 359/333 |
| 2014/0199072 A1 | 7/2014 | Nuijts et al. |

* cited by examiner

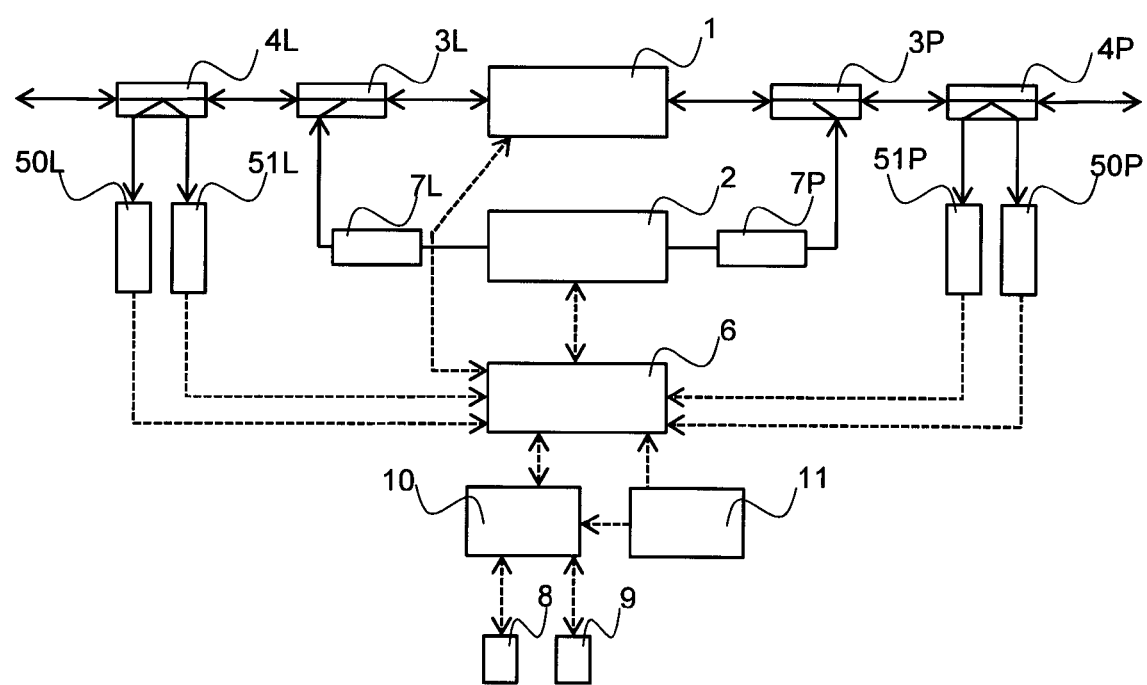

MODULAR KIT OF THE SPECTRALLY FLEXIBLE DEVICE FOR BIDIRECTIONAL TRANSMISSIONS OF OPTICAL SIGNALS SENSITIVE TO TIMING IN THE INTERNET AND OTHER NETWORKS

BACKGROUND OF THE INVENTION

The technical solution deals with a modular kit forming a device for optical amplification and monitoring of optical signals highly sensitive to delay variations when transmitted over the Internet and other networks, including networks implementing wave multiplexes, which can be deployed in a wide range of wavelengths and which is used in telecommunication technology and services.

DESCRIPTION OF PRIOR ART

At present, signals highly sensitive to delay variations, such as ultra-precise time and frequency, are transmitted using radio frequency methods and more recently also optical methods. Radio frequency methods, especially those using satellites, however are encumbered with errors resulting from atmospheric fluctuations during radio waves propagation. These can be subsequently partially compensated by calculations, this procedure however is not applicable in all cases. Optical methods in terrestrial conditions use transmission over optical fibers. However, due to mechanical stresses and temperature changes of the optical fibers, fluctuations of the signals transmission speed occur here also. When fibers are used, it is possible to arrange that the signals' physical travel paths are identical in both directions and subsequently the impacts of slow processes, it means those slower than the time the signal can travel through the fiber, can be compensated for. In practice, it means compensation of thermal effects and low-frequency vibrations.

The need for the both signal paths there and back to be identical, however, brings multiple issues, which in common telecommunications transmissions over optical fibers need not to be solved. These include in particular the effect of the Rayleigh backward scattering and reflections, for example from fused connections, connectors connecting passive elements and similar. In telecommunication transmissions, the impact of backward scattering and reflections is minimized by using isolators that prevent them from propagation. But when the paths of the amplified signals are required to be identical in both directions, isolators cannot be used because the signal can travel through the isolator in one direction only. For bi-directional communication with isolators inserted in the signal path therefore at least two signal paths are needed.

For amplification of bidirectional optical transmissions, the known solutions are similar to those for optical amplification of common telecommunication transmissions. In particular, such solutions exploit stimulated emission in the fibers or waveguides doped with rare earth, most commonly with erbium Er. However, these solutions are spectrally limited exactly by the used rare earth and material of the fiber or waveguide; in the case of erbium, typical limitation covers the telecommunication bands C, 1530-1565 nm, or L, 1565-1625 nm.

Another known solution of distributed amplification uses stimulated Raman scattering. This solution is not spectrally limited by the wavelength, but it requires relatively high powers for pumping signals in the transmission fiber as the Raman gain coefficient in the most common transmission fibers is low.

Another known solution uses stimulated Brillouin scattering, unfortunately this solution can be used for very narrow bandwidths only.

A solution based on semiconductor optical amplifiers, abbreviated hereinafter as SOA, is broadband and spectrally unlimited. SOAs are commonly available in the spectrum range minimum 800-1625 nm. Unfortunately, solutions for bidirectional transmissions of optical signals based only on SOAs are very sensitive to amplitude modulation of the transmitted signals and also to backward scattering and reflections. Backward scattering and reflections can cause instability or gain saturation as well as undesirable self-induced lasing of SOA.

There is a solution described in US2014/0199072 A1, which uses SOA for bidirectional transmissions of optical signals sensitive to timing. This solution, as one option, proposes to use SOA alone, which is unsuitable for amplitude-modulated signals but in particular it is not resistant against lasing by backward scattering and reflections. Alternatively, the document US2014/0199072 suggests to use an anti-parallel arrangement of two SOAs equipped with isolators in each branch. This solution is suitable also for amplitude-modulated signals and it is resistant to the effects of backward scattering and reflections, however the requirement for identical travel path distances in both directions is not fulfilled.

SUMMARY OF THE INVENTION

The setbacks mentioned above are solved by the modular kit of the spectrally flexible device for bidirectional transmissions of optical signals sensitive to timing in the Internet and other networks according to the presented solution. The kit is formed by the optical part interconnected with the electrical part, and it contains a semiconductor optical amplifier and at least one isolator. The principle of the new solution is that it further contains the source of the optical holding signal, which is bi-directionally connected to the control electronics module. This source of the optical holding signal is optically connected by its one output via the first isolator and the first wave-sensitive coupler to one optical input/output of the semiconductor optical amplifier and/or it is by its second output via the second isolator and the second wave-sensitive coupler connected to the second optical input/output of the semiconductor optical amplifier, which is electrically bi-directionally interconnected with the control electronics module, the input of which is connected to the output of the power supply module. Isolators here are inserted only in the path of the holding signal where their insertion does not affect the signal, on the contrary, they block the reflections, which therefore do not detune the source of the optical holding signal.

It is convenient, if it is used the source of the optical holding signal with adjustable output power and/or adjustable wavelength.

In one preferred embodiment the input/output of the first wave-sensitive coupler is optically connected to the first monitoring optical coupler, while its one output of the coupled optical signal is optically connected to the input of the first photodetector and its second output of the coupled optical signal is optically connected to the input of the second photodetector, and/or the input/output of the second wave-sensitive coupler is optically connected to the second monitoring optical coupler, while its one output of the coupled signal is optically connected to the input connected to the third photodetector and its second output of the coupled optical signal is optically connected to the input of the fourth photodetector. Outputs of photodetectors are interconnected with the control electronics module.

In another preferred embodiment, the control electronics module is connected directly or via communication computer to the wired communication interface module and to the wireless communication interface module, and it is also interconnected with the power supply module. A communication computer is then interconnected with the power supply module. The communication computer, including the wired and wireless communication interface modules, may preferably be formed by a single-board industrial computer without moving parts.

In another preferred embodiment the power supply module is redundant.

The advantage of the modular kit of the spectrally flexible device for bidirectional transmissions of optical signals sensitive to timing in the Internet, and other networks arranged as described, is that it allows to amplify signals transmitted in opposite directions with absolutely identical travel path in both ways and, in particular, that this solution can be used in very wide spectrum range 800-1625 nm. In addition, this solution features enhanced resistance against reflections from both line directions. Variability of the device allows to achievement of various levels of complexity by omitting some blocks, however comfort and resilience will be compromised.

EXPLANATION OF DRAWINGS

The principle of the technical solution is explained below and described by the attached drawing, which shows the block diagram of the device. In the attached drawing, full lines indicate optical connections and dashed lines indicate electrical connections.

DETAILED DESCRIPTION OF THE PREFERRED EMBODIMENTS

Modular kit of the spectrally flexible device for bidirectional transmissions of optical signals sensitive to timing in the Internet and other networks is in its most complete connection shown in the attached drawing.

The kit contains the semiconductor optical amplifier 1, abbreviated hereinafter as SOA, which if designed suitably allows to determine the operating area within a wide range of wavelengths. SOA 1 is electrically bi-directionally interconnected with the control electronics module 6, the input of which is connected to the output of the power supply module 11, which may be redundant. Another block is the source 2 of the optical holding signal, which is electrically bi-directionally interconnected with the control electronics module 6. It is advantageous if the source 2 of the optical holding signal has adjustable power and/or adjustable wavelength. Control electronics module 6 combines the three following functions: temperature stabilization and current control of the SOA 1; temperature stabilization and current control of the source 2 of the optical holding signal and possibly also its wavelength; and finally also measurement of optical powers at the photodetectors 50L, 51L, 50P, 51P.

Source 2 of the optical holding signal here is optically interconnected by its one output via the first isolator 7L and the first wave-sensitive coupler 3L with one optical input/output of the SOA 1. In the given example, simultaneously, the second output of the source 2 of the optical holding signal is interconnected via the second isolator 7P and the second wave-sensitive coupler 3P with the second optical input/output of the SOA 1. All combinations are possible; this includes connection via the first isolator 7L and the first wave-sensitive coupler 3L and/or via the second isolator 7P and the second wave-sensitive coupler 3P.

The modular kit may further be complemented in such a way that the input/output of the first wave-sensitive coupler 3L is optically connected to the first monitoring optical coupler 4L and/or the input/output of the second wave-sensitive coupler 3P is optically connected to the second monitoring optical coupler 4P. In this case then, one output of the coupled optical signal of the first monitoring optical coupler 4L is optically connected to the input of the first photodetector 50L and the second output of the coupled signal is optically connected to the input of the second photodetector 51L. Analogically, one output of the coupled optical signal of the second monitoring coupler 4P is optically connected to the input of the third photodetector 50P and its second output of the coupled optical signal is optically connected to the input of the fourth photodetector 51P. Inputs of photodetectors 50L, 51L, 50P, 51P are electrically interconnected with the control electronics module 6.

Another improvement of the kit, which is also shown in the attached block diagram, is that the control electronics module 6 is directly or via the communication computer 10 interconnected with the wired communication interface module 8 and the wireless communication interface module 9. Communication computer 10 is equipped with software for aggregation, storing and reporting the operating parameters and fault conditions to the control center. The software further allows to receive commands and create schedules for remote configuring of the device's operating parameters. Communication computer 10 is also interconnected with the power supply module 11. Communication computer 10, including the wired communication interface module 8 and the wireless communication interface module 9, can be implemented as the single-board industrial computer without moving parts to achieve lower costs and enhanced mechanical durability.

In the given example, the kit has the optical part, which consists of the SOA 1, source 2 of the optical holding signal, wave-sensitive couplers 3L, 3P, monitoring optical couplers 4L, 4P and photodetectors 50L, 51L, 50P, 51P optically connected to the outputs of these monitoring optical couplers 4L, 4P.

The electrical part consists of the control electronics module 6, which is interconnected with the power supply module 11 and the communication computer 10, which is also interconnected with the power supply module 11 and it is further interconnected with the wired communication interface module 8 and the wireless communication interface module 9.

The modular kit of the spectrally flexible device for bidirectional transmissions of optical signals sensitive to timing in the Internet and other networks is designed for optical amplification of these signals, typically during their transmission over optical fibers. The modular kit is inserted between the fiber sections to compensate for attenuation of the fiber transmission path.

The optical holding signal is brought from the source 2 of the optical holding signal via the first isolator 7L and the second isolator 7P to the inputs corresponding to the wavelength of the optical holding signal of the first wave-sensitive coupler 3L and the second wave-sensitive coupler 3P. The signal passes through these couplers to the SOA 1 where it prevents mutual interaction of the amplified signals and, in particular, it stabilizes gain in the SOA 1, thus preventing any undesirable self-oscillations and self-induced lasing.

Bidirectional optical signals to be amplified are connected to the inputs/outputs of the first monitoring coupler 4L and the second monitoring coupler 4P. In monitoring couplers 4L and 4P, a small known part of the signals is withdrawn and the remaining part of the signals continues further via the wave-sensitive couplers 3L and 3P to the SOA 1 where they are amplified. Withdrawn optical powers are measured by photodetectors 50L, 51L, 50P and 51P. This way, by means of the embedded software, the control electronics module 6 measures the values of input powers from both directions and the values of output powers to both directions. It can report them by means of the wired communication interface module 8 and the wireless communication interface module 9, and particularly, based on them, it can control the current of the SOA 1, current of the source 2 of the optical holding signal, possibly also the wavelength of the source 2 of the optical holding signal.

In one simplified embodiment, the source 2 of the optical holding signal is connected to the SOA 1 only by single branch, by means of the first wave-sensitive coupler 3L or the second wave-sensitive coupler 3P. Thus the first isolator 7P or the second isolator 7L can be omitted and also lower power of the source 2 of the optical holding signal is needed. The disadvantage is slightly asymmetrical behaviour of the device with respect to the amplified signals.

In other simplified embodiment, the first monitoring coupler 4L with the first photodetector 50L and the second photodetector 51L and the second monitoring coupler 4P with the third photodetector 50P and the fourth photodetector 51P are omitted. The advantage is reduced demand for components of the device, the disadvantage is no overview over the power conditions on the inputs and outputs of the device and subsequently, as these data are not available, it is not possible to adjust the operating parameters of the SOA 1 and the source 2 of the optical holding signal based on measured power conditions.

Also, the kit may not include the communication computer 6 and its wired communication interface module 8 and the wireless communication interface module 9. In this case, external connectivity is not required, the device operates in a stand-alone mode, it does not report operating parameters or fault conditions and cannot be controlled remotely. Another embodiment is possible when the communication computer 6 is omitted and the wired communication interface module 8 and the wireless communication interface module 9 are connected directly to the control electronics module 6. In this case, inter alia the consumption is reduced and communication with the device and its control are provided in simplified mode.

INDUSTRIAL APPLICABILITY

This technical solution provides good industrial applicability especially for optical transmissions of signals sensitive to timing. As opposed to the known solutions, it offers bandwidth over 100 nm and operating area in the wide range of wavelengths 800-1625 nm. The technical solution comprises also remote control and monitoring of the optical signals processed. Compared to the known solutions it offers absolutely identical travel path in both directions and it is resistant to the effects of backward reflections.

What is claimed is:

1. Modular kit of a spectrally flexible device for bidirectional transmissions of optical signals sensitive to timing in the Internet and other networks containing a semiconductor optical amplifier and at least one isolator, the modular kit of the spectrally flexible device comprising a source of an optical holding signal, wherein the source of the optical holding signal is electrically bi-directionally interconnected with a control electronics module, and wherein the source of the optical holding signal is optically interconnected to a first optical input/output of the semiconductor optical amplifier by a first output of the source of the optical holding signal via a first isolator of the at least one isolator and a first wave-sensitive coupler or wherein the source of the optical holding signal is optically interconnected to a second optical input/output of the semiconductor optical amplifier by a second output of the source of the optical holding signal via a second isolator of the at least one isolator and a second wave-sensitive coupler, wherein the semiconductor optical amplifier is electrically bi-directionally interconnected with the control electronics module, wherein an input of the control electronics module is connected to an output of a power supply module.

2. Modular kit according to claim 1, wherein the source of the optical holding signal is a source with at least one of: adjustable output power or adjustable wavelength.

3. Modular kit according to claim 1, wherein an input/output of the first wave-sensitive coupler is optically connected to a first monitoring optical coupler, wherein a first output of the first monitoring optical coupler is optically connected to an input of a first photodetector and a second output of the first monitoring optical coupler is optically connected to an input of a second photodetector, or wherein an input/output of the second wave-sensitive coupler is optically connected to a second monitoring optical coupler, wherein a first output of the second monitoring optical coupler is optically connected to an input of a third photodetector and a second output of the second monitoring optical coupler is optically connected to an input of a fourth photodetector, wherein respective inputs of each of the photodetectors are interconnected with the control electronics module.

4. Modular kit according to claim 3, further comprising a communication computer, including a wired communication interface module and a wireless communication interface module, wherein the communication computer comprises a single-board industrial computer without moving parts.

5. Modular kit according to claim 2, wherein an input/output of the first wave-sensitive coupler is optically connected to a first monitoring optical coupler, wherein a first output of the first monitoring optical coupler is optically connected to an input of a first photodetector and a second output of the first monitoring optical coupler is optically connected to an input of a second photodetector, or wherein an input/output of the second wave-sensitive coupler is optically connected to a second monitoring optical coupler, wherein a first output of the second monitoring optical coupler is optically connected to an input of a third photodetector and a second output of the second monitoring optical coupler is optically connected to an input of a fourth photodetector, wherein respective inputs of each of the photodetectors are interconnected with the control electronics module.

6. Modular kit according to claim 5, further comprising a communication computer, including a wired communication interface module and a wireless communication interface module, wherein the communication computer comprises a single-board industrial computer without moving parts.

7. Modular kit according to claim 1, wherein the control electronics module is interconnected directly, or via a communication computer, with a wired communication interface module and a wireless communication interface module, and wherein the communication computer is interconnected with the power supply module.

8. Modular kit according to claim 2, wherein the control electronics module is interconnected directly, or via a communication computer, with a wired communication interface module and a wireless communication interface module, and wherein the communication computer is interconnected with the power supply module.

9. Modular kit according to claim 3, wherein the control electronics module is interconnected directly, or via a communication computer, with a wired communication interface module and a wireless communication interface module, and wherein the communication computer is interconnected with the power supply module.

10. Modular kit according to claim 5, wherein the control electronics module is interconnected directly, or via a communication computer, with a wired communication interface module and a wireless communication interface module, and wherein the communication computer is interconnected with the power supply module.

11. Modular kit according to claim 1, wherein the power supply module is redundant.

12. Modular kit according to claim 2, wherein the power supply module is redundant.

13. Modular kit according to claim 3, wherein the power supply module is redundant.

14. Modular kit according to claim 4, wherein the power supply module is redundant.

15. Modular kit according to claim 5, wherein the power supply module is redundant.

16. Modular kit according to claim 6, wherein the power supply module is redundant.

17. Modular kit according to claim 7, wherein the power supply module is redundant.

18. Modular kit according to claim 8, wherein the power supply module is redundant.

19. Modular kit according to claim 9, wherein the power supply module is redundant.

20. Modular kit according to claim 10, wherein the power supply module is redundant.

* * * * *